Dec. 16, 1947.    V. J. SIGODA    2,432,545
CUTTING DEVICE
Filed March 23, 1942    2 Sheets-Sheet 1

INVENTOR.
VICTOR J. SIGODA
BY
Jacob J. Bobrow
ATTORNEY.

Dec. 16, 1947.  V. J. SIGODA  2,432,545
CUTTING DEVICE
Filed March 23, 1942  2 Sheets-Sheet 2

INVENTOR.
VICTOR J. SIGODA
BY Jacob J. Bobrow
ATTORNEY.

UNITED STATES PATENT OFFICE 2,432,545

CUTTING DEVICE

Victor J. Sigoda, Great Neck, N. Y., assignor to Man-Sew Corporation, New York, N. Y., a corporation of New York Application March 23, 1942, Serial No. 435,817

2 Claims. (Cl. 112—127)

The present invention relates generally to material cutting or trimming devices of the shear action type. In the instant application, there is shown and described its adaptation to any sewing machine using the four motion feed action principle. In particular, it is shown and described herein as applied to such a machine of the zigzag stitch class.

In this connection, the invention as so applied, is of the general class typified by Patent No. 1,777,138 to J. C. Ringe, of March 28, 1916, and Patent No. 1,388,411 to A. H. DeVoe, of August 23, 1921, although it is to be understood that the principles of operation are different. As so applied, this invention represents an improvement in this class of machine.

As so applied, this invention is useful to trim or cut the undermost of a number of layers or plies of material, such as fabrics, which have been joined, as by stitching, in the same operation. For example, in feminine undergarments, to obtain certain ornamental effects, it is desirable to overlay lace or some other decorative material on a base fabric. It is also desirable to join the lace with the body material, edge-to-edge, or to overlay the lace along the edge of the body material. Since such lace is often of intricate configuration, which it is desirable to follow, it is now generally required that the excess material underlying the applied material be cut away or out, by hand. It is thus a great advantage to be able to remove such excess material on the same machine and in the same operation, as the finished garment not only presents a more pleasing appearance, and is less bulky, but is also more quickly and economically produced.

Many inventors have attempted to make a practical machine of this character besides Ringe and De Voe. The inventor herein has been actively engaged in this particular field for many years. The only machine that has enjoyed any success, to his knowledge, has been the Ringe machine, which is not as versatile as a machine to which this invention has been applied, and which in addition, is of complicated construction, and therefore, necessarily expensive.

It has therefore been an object to provide a trimming device for the particular uses mentioned, of simplified structure, of great mechanical efficiency, of low cost, and which can be easily installed in present high speed industrial sewing machines as an attachment, requiring no important modification of the machine structure for its use.

It has been a further object to provide cutting means of novel construction whose use is not limited to application to such sewing machines, but which is suitable in many other applications where it is desired to cut only the lowermost of a number of layers of material.

It has been a still further object in connection with combined stitching and material cutting machines to overcome the disadvantage resulting from a pulsation of the work resulting from the common use of movable upper shear blades or knives, which cause the uncut portion of the work to reciprocate vertically with the cutting action. This undesirable vibration is not present with the machine to which this present invention has been applied. The improved structure also eliminates the menace of a moving upper blade or knife to the work and to the person of the operator.

A further object has been to so dispose the cutting elements as to facilitate the manipulation and handling of the work for the subsequent cut-off operation, to permit turning the work in any direction so as to be able to form square corners or to cut relatively sharp curves in the underlying ply, thus permitting many desired effects to be obtained.

A still further object has been to so operate the cutting means that it does not interfere with the advancing of the work, thus eliminating the possibility of wrinkling or bunching of the work. This is accomplished by proper timing of the cutting action in relation to the feed and stitch actions.

It has also been sought to provide a novel means of keeping the one ply sought to be trimmed separate from the others to eliminate the possibility of more than one ply being acted upon by the cutting means. This has been accomplished by the new horizontal extension of the stationary shear blade as described herein.

It has also been desired to perform the cutting without subjecting the operator to injury or the material to damage. Thus the moving blade or knife is so arranged that it can never reach other than the desired layer of material.

Still further objects are to provide a cutting means which is automatically adjustable for varying thicknesses of work, which has a positive shear action, and which automatically compensates for wear on the cutting faces; to operate the cutting means as simply as possible so that the machine structure is disturbed as little as possible in obtaining power for operation; and to provide a simple means to obtain a variation in the width of the margin between the stitching and the cut edge.

With the above and such other objects as will hereinafter appear, in view, the invention as applied herein can best be understood by reference to the following description and the claims, taken in conjunction with the accompanying drawings, in which like parts are designated by like reference characters, and in which:

Figure 1:
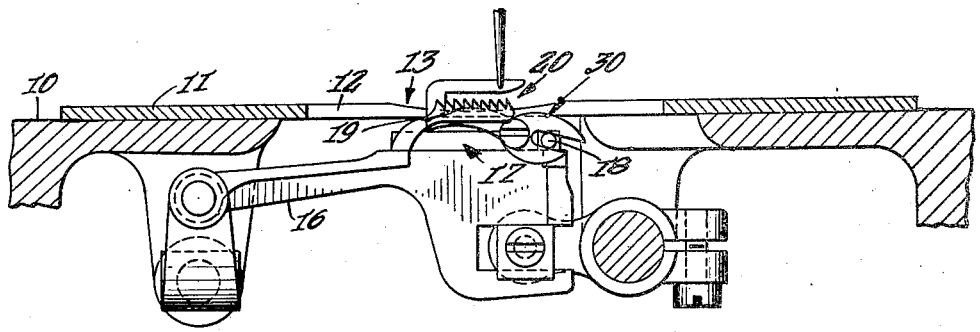
Fig. 1 is a sectional view taken from the operator's left, showing the invention as applied to a typical zig-zag stitch sewing machine.
Figure 2:
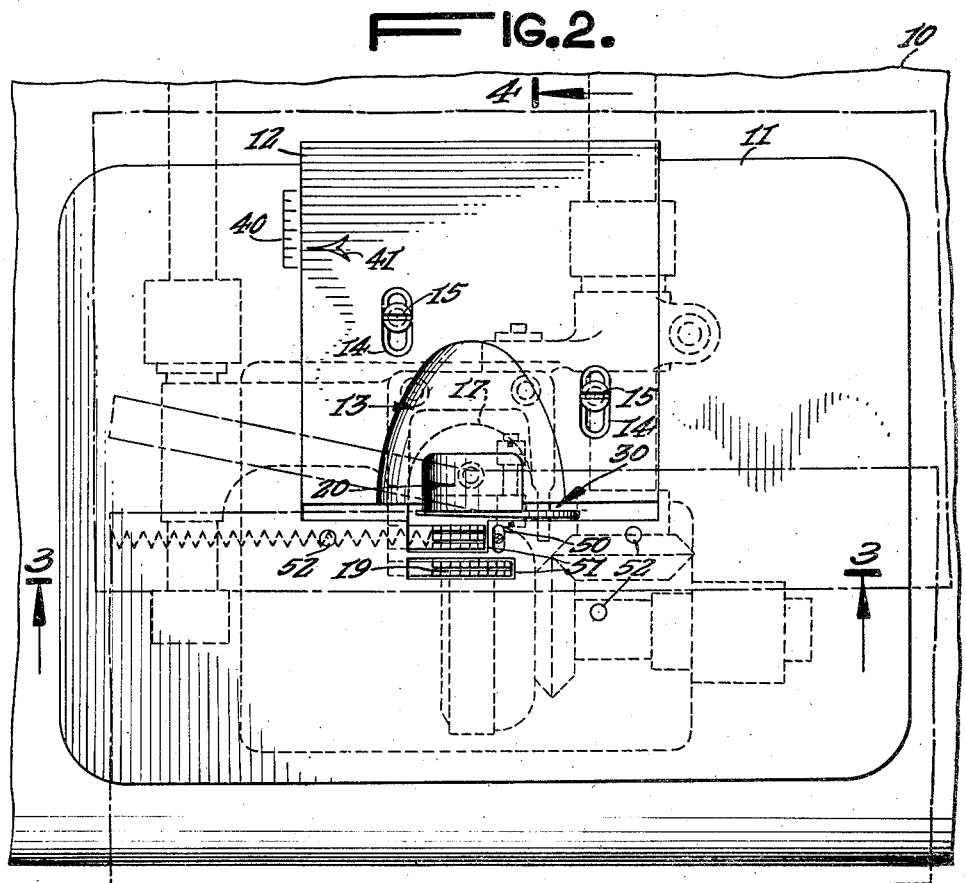
Fig. 2 is a plan view corresponding generally to Fig. 1, and indicating how two pieces of material may be joined by zig-zag stitching and how one edge of the under layer may be severed in the same operation.
Figure 3:
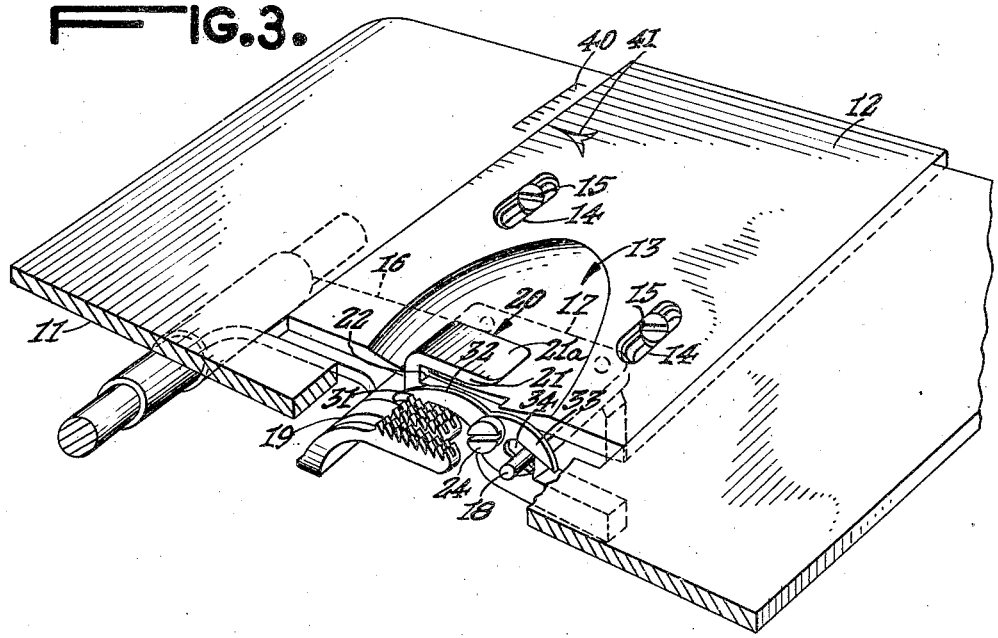
Fig. 3 is a perspective view of a section taken on lines 3—3 of Fig. 2 to show the arrangements of parts involved in applying the invention to such a machine.
Figure 4:
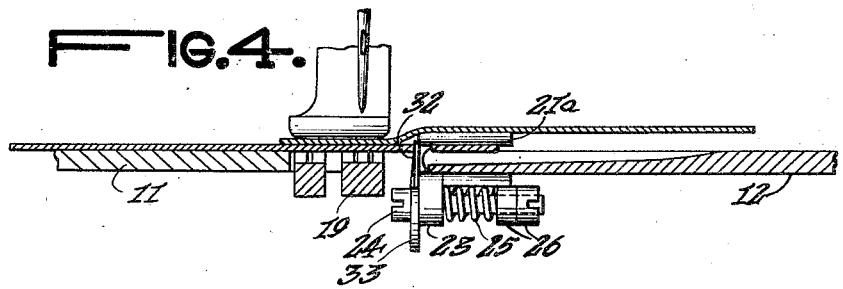
Fig. 4 is a side sectional view from the front taken on lines 4—4 of Fig. 2.
Figure 6:
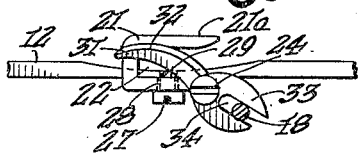
Fig. 6 is an elevational view taken from the end corresponding to Fig. 5, and showing how the cutting means is applied to a slide plate adapted for use on the machine mentioned.
Figure 5:
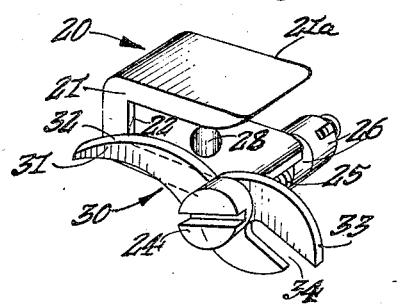
Fig. 5 is an enlarged detail view in perspective showing the novel cutting means employed.

Only so much of the zig-zag machine as is necessary to an understanding of the application of the invention, is indicated in the drawings, as those versed in the art will have no difficulty in applying the invention to any four motion feed action sewing machine from the following description and the drawings.

Referring now to the drawings, 10 represents the base of a zig-zag stitch sewing machine, from which the usual throat plate has been removed. The feed dog has likewise been removed from the feed bar 16 and replaced with a modified feed dog 17, having the usual toothed portion 19 and a portion 18 fashioned in to the shape of a shaft or axle. It will be apparent to those versed in the art that the four motion action of feed bar 16 will cause shaft portion 18 to have an eccentric action, which is utilized in the operation of the cutting means 20—30, as more fully hereinafter described.

A new base plate 11 is provided. It is sufficiently large to cover the entire area of the base 10 in the neighborhood centering about the needle and feed actions. This base plate 11 is provided with a needle hole 50, and slots 51 to receive toothed portion 19 of feed dog 17. Holes 52 are provided for passage of screws to secure plate 11 to base 10. Plate 11 has been cut out so that a slide plate 12, carrying the improved cutting means 20—30, can be slidably fitted therein. A scale 40 is engraved on base plate 11 and a corresponding marker 41 is engraved on slide plate 12. In conjunction, these are used to indicate the width of the margin remaining between the line of stitching and the cut off edge of the lower layer of material after the work has been operated upon.

Slide plate 12 has two longitudinal slots 14, through which pass screws 15 to hold it securely attached to machine base 10, in the desired position. The slots 14 permit ready lateral adjustment of the margin mentioned, and which is indicated by the scale and marker 40—41.

Slide plate 12 also has a depressed portion 13, the purpose of which will be presently explained.

In this depressed portion 13, a tapped hole 29 is provided to receive a screw 27, which serves to mount the cutting means 20—30 on slide plate 12.

The novel cutting means consists of a stationary blade 20 and a movable blade 30.

Stationary blade 20 has a slot 22 in its vertical face, which thus resembles a letter U lying on one side. The portion of this vertical face above slot 22 is designated as 21, and this portion 21 acts as the stationary shear blade. Upper portion 21 also extends horizontally away from the needle in a platform like extension 21a which over hangs depression 13 in slide plate 12 when the cutting means is in place. It is this extension 21a that acts as a separator of the plies of material, so that only the desired lower ply will be edge trimmed.

Stationary blade 20 has a lug portion 23 extending downwardly, having a clearance hole through which passes screw 24 in mounting movable blade 30. Another clearance hole 28 in the base portion of blade 20 permits mounting the cutting means 20—30 on slide plate 12 by means of screw 27 received in threaded hole 29.

Movable blade 30 has a cutting portion 31 having a beveled edge 32, and a portion 33 having a slot 34 to form a yoke. Blade 30 is pivotly mounted at about its central section on a portion of screw 24 which acts as a shaft or axle. The shear face of blade 30 is in close contact with the shear face 21 of stationary blade 20, and these faces are urged in close contact by means of spring 25 mounted on screw 24 between lug 23 and lock nuts 26. Adjustment of lock nuts 26 varies the tension of spring 25, and fixing the lock nuts 26 in position fixes the tension of spring 25 and the contact of the shear faces.

The cutting means 20—30 operates in conjunction with the stitching action of the machine as follows. As nothing is done to interfere with the stitching action, it functions normally. The feed action will also continue to function normally. It is obvious that the shaft portion 18 of the modified feed dog 17 will travel in a path governed by the four motions imparted to feed bar 16 by its associated operating parts.

As the yoked portion 33 of movable blade 30 is fitted over the shaft portion 18 of modified feed dog 17 when the invention is applied to the machine, the movement of the feed dog shaft portion 18 in an eccentric path within the yoke 33 will result in a vertical reciprocation of shear blade 30 against the shear face 21 of stationary blade 20. Any material passing under separator 21a and into slot 22 will be cut by the shear action of the blades. Thus in order to commence the cutting of the desired ply of material the operator causes it to pass under separator 21a. The other plies are passed over the top of separator 21a, and accordingly, are not cut as they are beyond the reach of the cutting action. Thus it is obvious, that if it is desired that no plies be cut, all that is necessary is to pass them all over the top of separator 21a.

Stationary blade 20 is mounted so that it does not project greatly above the surface of base plate 11, so that as little interference as is possible is had with the proper handling of the work. To facilitate this, slide plate 12 is provided with a depressed area 13. This permits blade 20 to be designed so that it projects less, and at the same time provides sufficient clearance for the passage of relatively heavy materials or a number of plies of material to the cutting action.

The resilient mounting of the movable blade 30 provides automatic adjustment of the shear blades for wear. This mounting also provides for close engagement of the shear faces so that the most efficient cutting is obtained. In addition, the spring mounting also compensates for a reasonable amount of wear on the shear faces.

It is desirable that the operation of the cutting means offer as little resistance as possible to the advancing of the work, thus reducing the likelihood of wrinkling of the work. The operation of the cutter has thus been so timed that the cutting action takes place while the work has momentarily stopped advancing and while the needle is within the work. The particular cut during each stitch cycle is completed before the feed dog takes up the work to advance it again. Thus, during that part of the stitch cycle when the work is being advanced, and the needle is withdrawn from the work, the cutting means are open, and there is no opposition to the movement of the work. As the cutting action does not interfere with or impede the action of the feed means upon the work, bunching or wrinkling is avoided. This has been accomplished by disposing and proportioning the parts and by deriving the operating motion as shown and described herein. The parts could be otherwise disposed and proportioned, or the motion might be otherwise derived so that the cutting action would take place during any other part of the stitch cycle, as desired.

To provide a high safety factor in the use of a machine adapted as described herein, movable blade 30 is disposed so that it will never rise above the top of the separator 21a. The separator portion 21a overhangs the shear edge of face 21, thereby eliminating the risk of damage or injury. As the shear faces are kept in tight engagement by the urging of spring 25, the only cutting that can take place is that expressly desired. As there is no piercing means on separator 21a, and as it is instead purposely blunted, no damage to materials can result.

Only a presently preferred embodiment of the invention as applied to a four motion action feed sewing machine has been described herein. It is apparent that the cutting means may be used separately as well as in conjunction with sewing machines of all types, with proper modification. It is possible to operate the cutting means by power derived in a number of different ways, either from a sewing machine or from other sources, or to use it as a hand operated shears. Accordingly, it is to be understood that the privilege is reserved of adopting all such legitimate modifications and changes in form, construction, relative arrangement of the parts, and derivation of operating power, as may fairly be considered within the spirit of the invention and the scope of the appended claims.

What is claimed herein is:

1. In combination with a sewing machine having a modified feed dog comprising a shaft portion adapted to travel eccentrically in a yoked blade, a slidable plate on the base of said machine, a fixed shear member attached to said slidable plate, said fixed shear member comprising an upper horizontally disposed platform extending in a direction away from the needle of said machine, a lower horizontally disposed platform spaced below said upper platform and a vertically disposed side wall interconnecting said upper and lower platforms, a movable shear member pivotally mounted on said lower platform and adapted to coact in shearing relationship with an edge of said upper platform, whereby material plies fed to the needle for sewing may be separated, with the ply which it is desired to cut being fed under said upper platform, while at the same time the ply which it is desired to leave uncut is passed over said upper platform, said movable shear member having a yoked portion to receive a rocking motion from the said modified feed dog.

2. The combination according to claim 1 in which the said slidable plate is provided with a recess and in which the said upper platform of said fixed shear member is disposed above said recess.

VICTOR J. SIGODA.

REFERENCES CITED

The following references are of record in the file of this patent:

UNITED STATES PATENTS

| Number | Name | Date |
|---|---|---|
| 1,177,138 | Ringe | March 28, 1916 |
| 609,622 | Morrison | Aug. 23, 1898 |
| 254,319 | Holton | Feb. 28, 1882 |
| 480,377 | Woodward et al. | Aug. 9, 1882 |
| 561,078 | Allen | June 2, 1896 |
| 1,388,411 | De Voe | Aug. 2, 1896 |
| 244,532 | Bigelow | July 19, 1881 |
| 902,453 | Scott | Oct. 27, 1908 |
| 902,532 | Hayes et al. | Oct. 27, 1908 |
| 1,586,163 | Scharaf | May 25, 1926 |
| 365,716 | Willcox | June 28, 1887 |
| 348,485 | Willcox | Aug. 1, 1886 |

FOREIGN PATENTS

| Number | Country | Date |
|---|---|---|
| 13,273 | Great Britain | Sept. 30, 1887 |